Oct. 29, 1940.   R. SELIGMAN ET AL   2,219,637
FLOW RETARDER
Filed Jan. 9, 1939

INVENTORS
R. SELIGMAN
H. F. GOODMAN by
Young, Emery + Thompson
Attorneys

Patented Oct. 29, 1940

2,219,637

UNITED STATES PATENT OFFICE 2,219,637

FLOW RETARDER

Richard Seligman and Hugh Frederick Goodman, Point Pleasant, Wandsworth, London, England, assignors to The Aluminum Plant & Vessel Company Limited, London, England, a British company Application January 9, 1939, Serial No. 250,026
In Great Britain January 12, 1938

3 Claims. (Cl. 138—40)

This invention relates to means for controlling the flow or passage of liquids such as milk or beer during a pasteurisation treatment in a plate type heat exchange apparatus.

In such apparatus, the passages for the flow of the liquid under treatment are usually of very small cross sectional area in order to obtain a rapid flow of the liquid and, when and where it is found necessary to make provision for the retarding of the flow so as to lengthen the period during which the liquid is subjected to the action of the heating or cooling medium, there is inserted in the plate assemblage one or more plates or frames affording channels or passages of increased capacity or cross sectional area. In this connection, reference is directed to British Patent No. 307,425.

Heretofore these retarding plates have, as a rule been similar to the plates used for heat exchange but of enlarged depth and with fewer and larger channels or passages through which the liquid has moved more slowly. Alternatively, they have taken the form of relatively deep frames into which a number of equidistant baffles have been inserted with the object of giving the liquid a lengthened path. Both these and similar devices have entailed considerable additional expense without countervailing advantages since they produce vortices or eddies which by unduly retarding some of the liquid allow other portions to escape from the retarder prematurely.

According to the present invention there is provided means for controlling the flow or passage of liquids such as milk or beer during a pasteurisation treatment in a plate type heat exchanger comprising a retarding chamber consisting of an open frame of the requisite depth closed on either side by a plate and provided with means for admitting liquid to one end of the chamber, the construction being such that the liquid is admitted uniformly across the whole width of the chamber or that a flow controlling means is provided within the chamber immediately adjacent the inlet in order to ensure as far as possible that each particle of liquid is subjected in the chamber to substantially the same retarding influence as it passes therethrough.

The controlling means within the chamber may take various forms but preferably comprises one or more perforated plate members disposed within the plate or frame of increased capacity immediately adjacent the inlet thereto so as to extend transversely across the path of movement of the liquid.

According to another feature of the invention the entry of the liquid into the retarding chamber is at right angles to the direction of flow of the liquid and is preferably such that it extends over the maximum width.

If desired, a cloth or gauze which may also serve as a filtering medium may be associated with the perforated plate or plates when used or with the entrance opening.

In order that the said invention may be clearly understood and readily carried into effect, the same will now be more fully described with reference to the accompanying drawing, in which.

Figure 1:
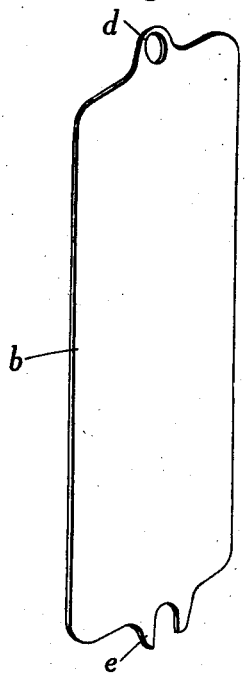
Fig. 1 shows one side-closing plate.
Figure 2:
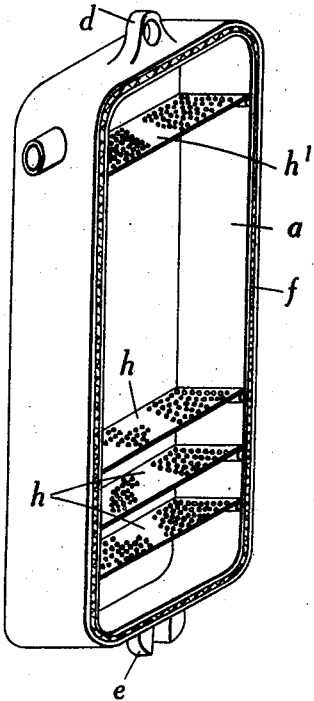
Fig. 2 shows the open-frame of the retarding chamber.
Figure 3:
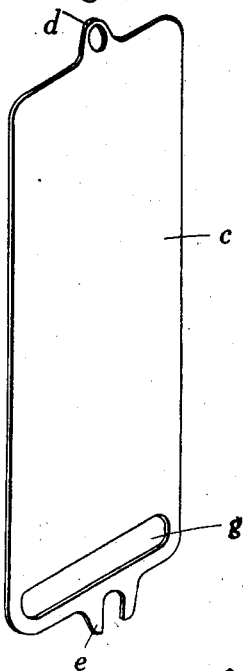
Fig. 3 shows the other side-closing plate.

In the embodiment illustrated, the retarding chamber is formed by the space provided between three members, to wit, an open frame $a$, a side closing plate $b$ and another side closing plate $c$. Each member may be provided at its upper end with an apertured lug $d$ and at its lower end with a slotted lug $e$ so as to enable the same to be supported in position on the bars which serve to support the other elements of the plate assemblage. At its marginal edges, the open frame is provided with a groove accommodating a gasket or rubber strip packing $f$ for making the chamber liquid tight. Also, at or near its lower end the chamber is provided with a liquid inlet which is preferably formed by an opening $g$ in one of the side closing plates and is arranged so that the liquid can be admitted uniformly across the whole width of the chamber. The space within the frame may be entirely open (i. e. devoid of plates, obstructions or flow controlling means) or there may be disposed immediately above the inlet opening one or more horizontal plates $h$ formed with a series of small openings or perforations. By this arrangement, the passage of the liquid into the space provided within the retarder plate is controlled in such a manner that the liquid is caused to rise at a uniform rate therethrough and the possibility of some of the liquid particles escaping through the outlet without being held in the retarding chamber for the requisite period of time is reduced. It should be noted that the perforated plate or plates is or are located immediately adjacent the inlet and that the space above the plate or plates may be entirely free from obstructions or, in some instances, another perforated plate $h'$ may be provided immediately adjacent the outlet opening at or near the upper end of the retarder plate. In other words, in accordance with the present invention in the space within the retarding chamber or in the greater portion of the said space, the liquid is free to flow at a uniform rate without encountering any obstructing means.

Having now particularly described and ascertained the nature of the invention and in what manner the same is to be performed we declare that what we claim is:

1. A retarder element adapted to be inserted in a built-up plate-type heat exchanger for delaying the passage of a liquid in the course of pasteurization, comprising an open frame closed on both sides by plates, and means for causing liquid entering the frame to be uniformly distributed over the whole width thereof, said means consisting of a plurality of perforated plates disposed immediately adjacent the inlet and the frame being formed so that the liquid after passing through said perforated plates flows on through a large quiescent free space permitting unhindered passage of the liquid to a point adjacent an outlet opening.

2. A retarder element adapted to be inserted in a built-up plate-type heat exchanger for delaying the passage of a liquid in the course of pasteurization, comprising an open frame of the requisite depth, a side-closing plate at each side of the said frame, one of the said side-closing plates being formed with a liquid inlet opening, and a plurality of perforated plates disposed adjacent said inlet opening, the open frame being formed to provide a large quiescent free space for the free unhindered flow of liquid which has passed through the perforated plates.

3. A retarder element adapted to be inserted in a built-up plate-type heat exchanger for delaying the passage of a liquid in the course of pasteurization, comprising an open frame of the requisite depth, a side-closing plate at each side of the said frame, one of the said side-closing plates being formed with a liquid inlet opening, and a plurality of perforated plates disposed adjacent said inlet opening, the open frame being formed to provide a large quiescent free space for the free unhindered flow of liquid which has passed through the perforated plates and the inlet opening being formed so that it extends over nearly the whole width of the side-closing plate.

RICHARD SELIGMAN.
HUGH FREDERICK GOODMAN.